(12) United States Patent
Tehranchi et al.

(10) Patent No.: US 6,509,919 B1
(45) Date of Patent: Jan. 21, 2003

(54) APPARATUS ADAPTED TO SENSE A COLORANT AND METHOD FOR SENSING COLOR AND DETECTING A DONOR MISPICK CONDITION

(75) Inventors: Babak Tehranchi, Rochester, NY (US); Robert W. Spurr, Rochester, NY (US); Michael E. Schultz, Rochester, NY (US)

(73) Assignee: Eastman Kodak Company, Rochester, NY (US)

(*) Notice: Subject to any disclaimer, the term of this patent is extended or adjusted under 35 U.S.C. 154(b) by 0 days.

(21) Appl. No.: 09/654,710

(22) Filed: Sep. 1, 2000

(51) Int. Cl.[7] .................................................. B41J 35/16
(52) U.S. Cl. ...................................... 347/178; 347/177
(58) Field of Search ................................ 347/177, 178, 347/187, 176, 213, 215, 221; 358/518; 702/85; 382/165

(56) References Cited

U.S. PATENT DOCUMENTS

| | | | |
|---|---|---|---|
| 4,536,772 A | 8/1985 | Isogai | 347/176 |
| 4,573,059 A | 2/1986 | Shinma et al. | 347/178 |
| 4,630,288 A | 12/1986 | Longstaff et al. | 375/261 |
| 4,710,781 A | 12/1987 | Stephenson | 347/178 |
| 4,930,008 A | 5/1990 | Suzuki et al. | 358/500 |
| 5,027,195 A | 6/1991 | Cooley et al. | 358/500 |
| 5,196,868 A | 3/1993 | No et al. | 346/134 |
| 5,226,640 A | 7/1993 | Puzey | 271/107 |
| 5,266,967 A | 11/1993 | Maslanka et al. | 347/178 |
| 5,268,708 A | 12/1993 | Harshbarger et al. | 346/134 |
| 5,329,537 A | 7/1994 | Alard et al. | 714/794 |
| 5,335,043 A | 8/1994 | Kluger et al. | 399/16 |
| 5,393,149 A | 2/1995 | Iima | 400/208 |
| 5,415,486 A | 5/1995 | Wouters et al. | 400/692 |
| 5,428,371 A | 6/1995 | Fox et al. | 347/262 |
| 5,466,075 A | 11/1995 | Kouzai et al. | 400/240.3 |
| 5,519,428 A | 5/1996 | Van Peteghem | 347/215 |
| 5,549,400 A | 8/1996 | Tang et al. | 400/236 |
| 5,563,686 A | 10/1996 | Beaufort et al. | 399/13 |
| 5,739,927 A * | 4/1998 | Balasubramanian et al. | 358/518 |
| 5,978,005 A | 11/1999 | Hadley | 347/177 |
| 6,000,871 A | 12/1999 | Fisher, Sr. | 400/706 |
| 6,204,874 B1 * | 3/2001 | Amos | 347/176 |
| 6,269,182 B1 * | 7/2001 | Ishii | 382/165 |
| 6,272,440 B1 * | 8/2001 | Shakespeare et al. | 702/85 |

OTHER PUBLICATIONS

"*Digital Communication*" by Edward A. Lee and David G. Messerschmitt, Kluwer Academic Publishers, Boston, Mass., 1988, pp. 256–259.
"*Error Control Coding Fundamentals and Applications*" Shu Lin and Daniel J. Costello, Jr., Prentice–Hall, Inc., Englewood Cliffs, N. J., 1983, pp. 8–11.
*Communication Systems, Second Edition* Simon S. Haykin, John Wiley & Sons, New York, 1983, pp. 523–527.

* cited by examiner

Primary Examiner—Hai Pham
(74) Attorney, Agent, or Firm—Norman Rushefsky

(57) ABSTRACT

An apparatus for donor colorant detection and donor pick sensing employs N light sources of distinct wavelengths paired with N photosensors. Measured light values for a donor are combined to form an N-dimensional coordinate value which is then compared against N-dimensional reference values to determine a color or donor picking condition. The decision algorithm uses a decision rule based on Maximum Likelihood Decoding methods, whereby an Euclidean distance is computed between the measured N-dimensional coordinate value and each of a set of reference N-dimensional coordinate values. The apparatus and method detect which donor color has been picked and also detects and identifies multi-pick and pick failure conditions.

53 Claims, 6 Drawing Sheets

APPARATUS ADAPTED TO SENSE A COLORANT AND METHOD FOR SENSING COLOR AND DETECTING A DONOR MISPICK CONDITION

FIELD OF THE INVENTION

This invention generally relates to a printing apparatus and method wherein an image is written by transferring a colorant from a translucent sheet of donor film onto a substrate, and more particularly relates to an apparatus and method for sensing a donor colorant to detect a donor mispick condition.

BACKGROUND OF THE INVENTION

In a printing apparatus that employs a color thermal transfer process, a translucent donor sheet comprises a film material containing an applied colorant. At the printhead of such apparatus, heat energy is used to selectively transfer colorant from the donor sheet onto a receiver substrate material to produce the final image. As representative examples, types of thermal printing apparatus include those that employ resistive printheads, such as is disclosed in U.S. Pat. No. 5,519,428 (Van Peteghem), as well as printing apparatus that employ laser thermal printheads, such as is disclosed in U.S. Pat. No. 5,268,708 (Harshbarger et al.) The receiver material onto which an image is written could be a paper substrate, a film substrate (such as an intermediate that holds an image that will be transferred to another receiver medium, as is disclosed in the Harshbarger et al. patent), or other substrate material used for imaging.

In such printing apparatus, the donor colorant can be a dye, ink, pigment, or other suitable material that is transferred from a donor sheet onto a receiver medium. Conventional color printers provide donor colorant in the standard (CMY or CMYK) process colors, cyan (C), magenta (M), and yellow (Y), with the possible addition of black (K) donor. The donor supply source can be a roll that provides a continuous ribbon on which successive CMY or CMYK color patches are provided as described in the Van Peteghem patent. Optionally, the donor supply source can be a mechanism that provides the printhead with a single sheet of donor at a time, such as a tray, for example.

Whether the donor is provided in roll or sheet form, it is important that the printing apparatus be able to identify the color of the donor that is supplied to the printhead. In addition, it is also important to have donor sheet material correctly loaded in the proper position and orientation, so that printing is accurate and to minimize the possibility of damage to printhead components. If, for example, donor sheet material is fed with the wrong side of the sheet facing the printhead, colorant could be improperly transferred onto printhead components, making it necessary to clean or even to replace the printhead. With sheet feeding apparatus, if multiple sheets are inadvertently picked from a tray (or fed from a manual feed slot), a jam condition can occur, causing damage to printhead components if not detected.

Conventional printing apparatus have solved the above-noted problems of color identification, donor orientation, and mispick detection in a number of ways. Where donor is provided in ribbon form (such as disclosed in the Van Peteghem patent noted above), mispick is not a problem, since the donor is fed from a source roll to a take-up roll. Proper donor orientation is typically obtained by methods such as keying the supply roll to allow its insertion in only the correct manner or by supplying the donor ribbon in reloadable cassette form, such as is disclosed in U.S. Pat. No. 5,415,486 (Wouters et al.). For donor in ribbon form, color detection is inherently a simpler problem than it is for donor supplied in sheet form. This is because donor patches on the ribbon, as manufactured, follow each other in a known sequence. However, printers using donor ribbon have employed a number of different techniques for color detection, as noted below.

Notching is one solution that has been employed to solve the above-noted problems. U.S. Pat. No. 5,196,868 (No et al.) discloses detection of a notch in an image receiver sheet for sensing proper orientation (that is, "coated side up"). U.S. Pat. No. 4,536,772 (Isogai) discloses sensing notch position in a sheet-fed donor media to indicate donor color. Notching is easy to detect; however, this method requires a manufacturing step and is a limited solution for differentiation between colors that might be similar. Significantly, notching, by itself, does not provide a solution for mispick detection where multiple sheets are picked.

As another method for color identification, markings have been provided on donor media for optical sensing. For example, U.S. Pat. No. 5,393,149 (Iima) discloses optical sensing of an ink ribbon cartridge using identifying marks readable through the cartridge housing. U.S. Pat. No. 4,573,059 (Shinma et al.) discloses optical sensing of marks placed on the edge of an ink donor sheet, where physical dimensions of the mark itself indicate the corresponding donor color. U.S. Pat. No. 5,978,005 (Hadley) discloses use of a delimiting stripe to define the borders between colors in a color thermal ribbon, with an indexing stripe to indicate the beginning of each sequence of color patches. While such markings on an edge of the donor material can be used to identify color, providing marks correctly positioned in manufacture can be costly.

Optical sensing of the donor color itself, possible when a donor is translucent, has been employed as a method for color identification. U.S. Pat. No. 4,710,781 (Stephenson, reissued as RE 33,260) discloses, for a thermal printer using a ribbon donor, sensing red and yellow LEDs that transmit light through a translucent donor. Using this method, photosensors are adapted to detect particular wavelengths of transmitted light above or below specific threshold values. Truth-table logic, based on detection by a pair of photosensors, is then used to determine the color of the patch sensed, based on this wavelength detection. Similarly, U.S. Pat. No. 5,466,075 (Kouzai et al.) discloses, for an ink sheet, use of three color sources transmitted through a translucent identifying portion (ID mark) in the donor and three corresponding sensors used to help distinguish color patches. Notably, in the Kouzai et al. disclosure, a specific ID mark is provided adjacent to each patch on the donor. The ink donor color itself is not sensed.

The use of multiple light sources as disclosed in both the Stephenson and Kouzai et al patents noted above provides crude differentiation of color patches for ribbon donor. By sensing, over specific narrow wavelengths, the characteristic levels of light energy transmitted through a translucent color donor by light sources, emitting light over corresponding narrow wavelengths, some level of color differentiation is possible. However, these existing methods have significant drawbacks for printing apparatus used in applications such as color proofing (for example, for the device disclosed in the Harshbarger patent noted above). Using conventional methods, photosensors are designed for fairly crude detection thresholds that allow for a wide possible range due to factors such as component aging, LED and sensor cost, and batch manufacturing differences. For this reason, such an approach has limitations where specially formulated colors (that is, colors other than the standard process CMYK colors) are used. It can be difficult or impossible to detect specially formulated colors using a detection scheme that uses the coarse "truth table" decision mechanisms disclosed in either Stephenson and Kouzai et al patents. Moreover, it can be impossible to detect subtle color shifts between donors, such as have become expected in printers used for color proofing. (For example, different yellow donors are preferred for printing in Europe than are used in the U.S.)

Certainly, it would be possible to employ an array of sensors similar to those used within color scanners, as disclosed in U.S. Pat. No. 5,027,195 (Cooley et al.) and in U.S. Pat. No. 4,930,008 (Suzuki et al.) However, such scanner devices are optimized for scanning the full dimensions of an image area and providing data on the primary RGB (Red, Green, and Blue) color content as sampled at an array comprising several thousand points over an area. Further, while such a scanning apparatus can be used to provide data on RGB color content of a sheet, this data must then be further processed in some way in order to differentiate donor colors. Moreover, with such an arrangement, the cost of scanning sensors would be prohibitive. It would be advantageous to employ low-cost sensors and light sources to sense donor color accurately and to use the sensed data thus obtained to differentiate one donor color from another.

In a printing apparatus, the task of a color donor sensing system is to identify, given a defined set of possible donor color types, the most likely type that has been sensed. For such a system, there can be a number of conditions that affect the quality of the data sensed, such as variables between batches, component aging, and environmental conditions. In this way, a color donor sensing system faces problems similar to problems encountered in data transmission. Decoding methods for data received across a noisy transmission channel attempt to differentiate a data signal from its surrounding noise. A received signal can only have one of discrete number of possible values. Data coding theory, using statistical tools, provides techniques that allow a data receiving system to arrive at a "best estimate" of a transmitted signal. One such technique that provides a way to identify a specific discrete data point as such an estimate is termed Maximum Likelihood Decoding (MLD).

Briefly, MLD considers a data point as having an N-dimensional observation space, where N is an integer corresponding to the number of data components, or coordinates, that define a vector of an observed data point relative to an origin. (A data point in 3-dimensional observation space has 3 coordinates (x,y,z) and its origin is (0,0,0); a data point in 4-dimensional observation space has 4 coordinates (x,y,z, q) and origin (0,0,0,0), and so on.) In practice, the MLD technique follows a simple decision rule, as follows: determine the closest established data point relative to the observed data point. A simple Euclidean distance is computed to find the minimum distance between an observed point and an established, known reference data point.

U.S. Pat. No. 4,630,288 (Longstaff et al.) discloses the use of Maximum Likelihood Detection in signal decoding of binary data. Notably, Longstaff et al. discloses an observation space having 8 dimensions (that is, N=8). U.S. Pat. No. 5,329,537 (Alard et al.) discloses use of a Viterbi decision algorithm for data decoding, the algorithm itself based on Maximum Likelihood Detection.

It can be seen that it would be advantageous to provide a color-sensing solution that also provides mispick detection.

Conventional solutions for multiple-pick detection with sheet handling equipment (such as printers and xerographic copiers) include use of a force transducer in the sheet travel path, such as is disclosed in U.S. Pat. No. 5,335,043 (Kluger et al.) or sensing the correct separation of pinch rollers as is disclosed in U.S. Pat. No. 5,226,640 (Puzey). However, sensing such mechanical conditions can be costly, complex, maintenance-intensive, and error-prone. Other methods used in paper sheet handling (such as detection of relative suction level difference when multiple sheets have been lifted from a tray) cannot be used with donor film substrate due to physical differences between film and paper.

Therefore, it can be seen that there is a need for a printer having donor color detection and a donor color detection method that accurately determines the color of a donor and that senses a mispick condition.

SUMMARY OF THE INVENTION

It is an object of the present invention to provide a color sensing apparatus adapted to sense color donor type and to sense correct picking of a donor sheet. It is also an object of the present invention to provide a method for detecting color donor type and correct picking.

With these objects in view, the present invention provides a color sensing apparatus for distinguishing a colorant from a set of predefined colorants, the color sensing apparatus comprising:

(a) a plurality of N light sources, each light source capable of emitting light having a predefined optical wavelength;

(b) for each of said plurality of N light sources, a corresponding optical sensor, each said optical sensor responsive to said predefined optical wavelength and providing a variable output signal that is indicative of the sensed level of said predefined optical wavelength;

(c) a control logic processor adapted to accept each said variable output signal from each of N said corresponding optical sensors, said processor further adapted to convert each said variable output signal to a numerical value, to assign a measured N-dimensional coordinate value comprising each of N said numerical values, to compare said measured N-dimensional coordinate value to a stored reference N-dimensional coordinate value, and to identify said colorant thereby.

According to an embodiment of the present invention, a printer uses three (N=3) light sources having distinctive wavelengths, namely red, green, and blue LEDs. Each light source has a corresponding photosensor that provides an output signal that is indicative of the relative level of red, green, or blue light, respectively, transmitted through a donor sheet. Photosensors are mounted directly on a suction bar that lifts the donor sheet from its supply source and guides the donor sheet up to position for mounting on an imaging drum. Readings are taken as the photosensors are aligned across from the red, green, and blue LEDs. The three analog photosensor readings are each converted into a corresponding numeric value to create a 3-dimensioned coordinate value representative of the sensed donor readings. Calculations are then performed in order to compute a Euclidean distance between the 3-dimensioned coordinate value thus established and a known reference coordinate value for a given donor color (typically C, M, Y, K, or other color) or donor condition (such as multiple donor sheets picked or no donor sheet picked). Light sources and sensors are also utilized to detect correct donor orientation by sensing a notch in the donor.

Viewed from another aspect, the present invention, provides a method for sensing a donor color using a plurality of N paired light sources and sensors, where each light source emits light at a characteristic wavelength and each sensor, in response, provides an output signal level indicative of the amount of the light sensed. The plurality of N sensor signal levels are converted to N corresponding numerical values and combined to provide an N-dimensioned measured coordinate value indicative of the sensor measurement. In order to identify donor color and possible mispick conditions, this N-dimensioned measured coordinate value is compared against one or more N-dimensioned reference coordinate values that were obtained during periodic calibration of the donor color sensing apparatus. In a preferred embodiment, the method for comparison comprises computing a Euclidean distance between N-dimensioned measured and N-dimensioned reference coordinate values. A decision rule is applied whereby the most likely color or most likely possible mispick condition is determined based on the smallest value of Euclidean distance thus computed.

It is a feature of the present invention that it utilizes a Maximum Likelihood Detection algorithm to identify specific reference data points of interest (that is, donor colors or picking conditions) and to differentiate data from noise (due, for example, to component aging and batch variation).

It is an advantage of the present invention that it provides a flexible, adaptable method for color detection, allowing, for example, 3, 4, 5, or more light source/sensor pairs to be employed for accurate sensing of color. Wavelength selection for light source/sensor pairs can be optimized, depending on the donor colors available and on the pick conditions to be sensed.

It is a further advantage of the present invention that it utilizes low-cost light source and sensor components, yet provides highly accurate color detection as well as mispick and pick failure detection.

It is yet a further advantage of the present invention that it allows ease of calibration to accommodate variability due to factors such as aging of components and slight color shifts from one batch of donor to another.

These and other objects, features, and advantages of the present invention will become apparent to those skilled in the art upon a reading of the following detailed description when taken in conjunction with the drawings wherein there are shown and described illustrative embodiments of the invention.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

DETAILED DESCRIPTION OF THE INVENTION

The present description is directed in particular to elements forming part of, or cooperating more directly with, apparatus and methods in accordance with the invention. It is to be understood that elements not specifically shown or described may take various forms well known to those skilled in the art.

Figure 1:
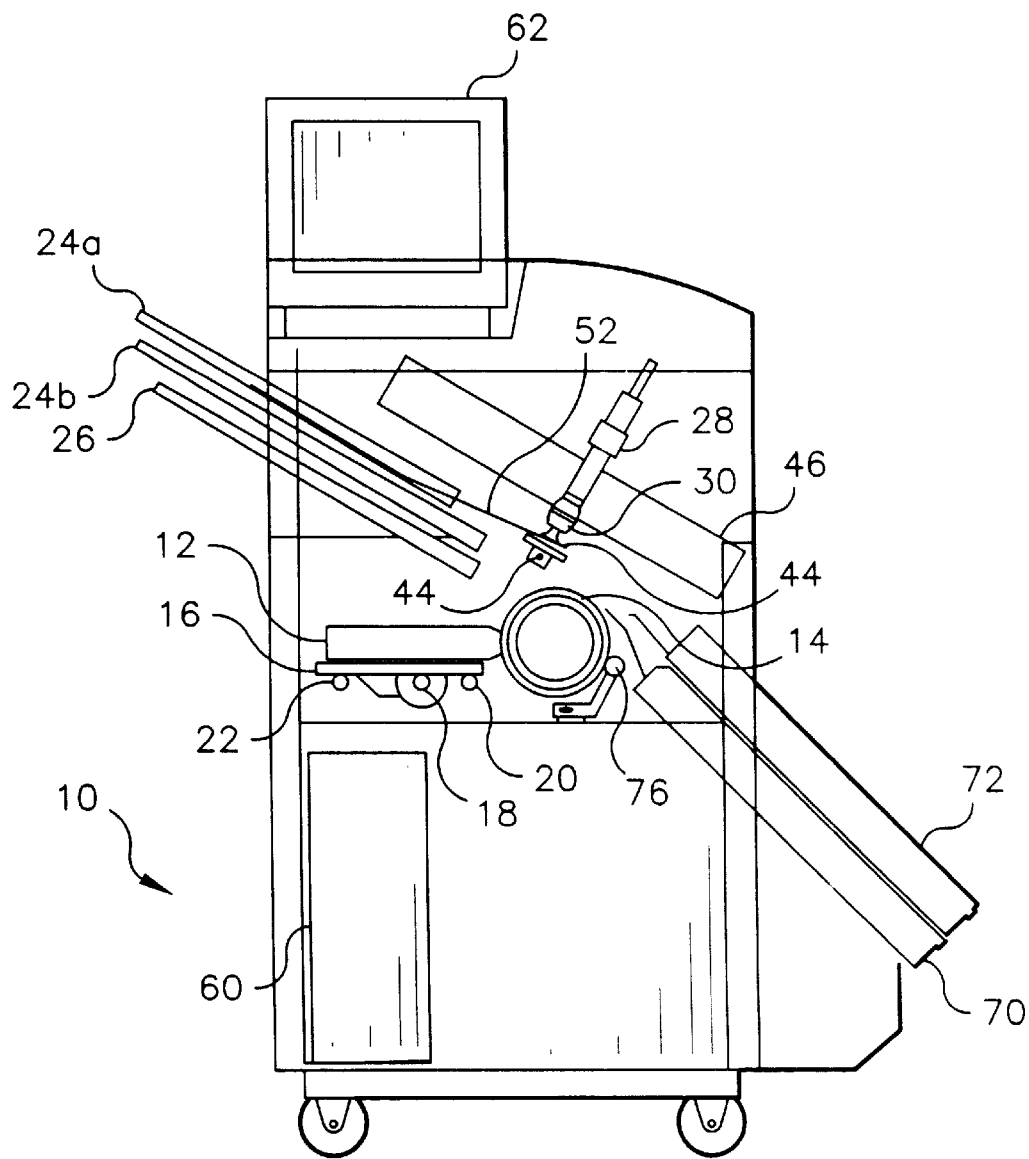
FIG. 1 is a side view showing a printing apparatus adapted for donor sheet sensing according to the present invention.

Referring to FIG. 1, there is shown, in side view, a printing apparatus 10 adapted for donor sensing. Printing apparatus 10 utilizes a printhead 12 that images by writing to media wrapped about an imaging drum 14. Printhead 12 writes its image in a continuous swath, printhead 12 being mounted on a printhead translation apparatus 16 that is moved along a leadscrew 18 and guided along a front guide rod 20 and rear guide rod 22. Printhead 12, imaging drum 14, and support components for mounting and writing using laser thermal printing are similar in form and function to the same devices as used in the printing apparatus described in the Harshbarger et al. patent noted above. Reference is made to the Harshbarger et al. patent for general background details on printhead 12 motion when writing an image using laser thermal imaging media.

Referring again to FIG. 1, a control logic processor 60 provides the necessary logic and machine commands for controlling the operation of printing apparatus 10 components.

Figure 2:
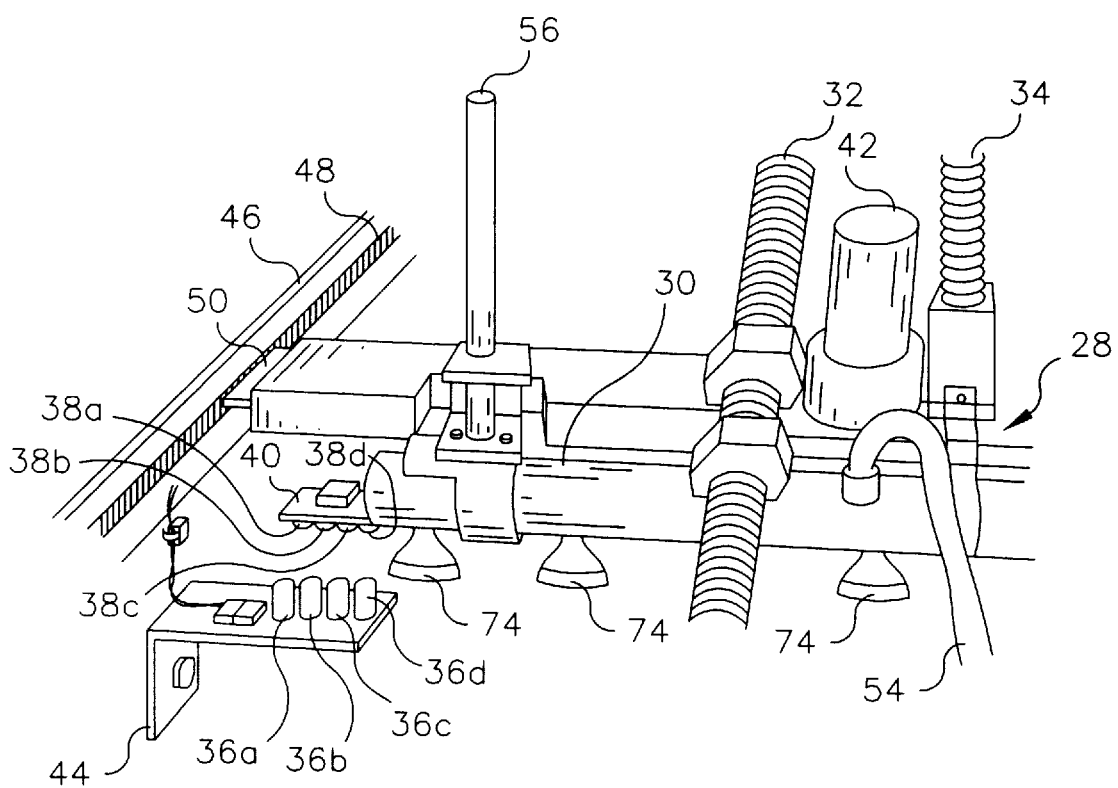
FIG. 2 is a perspective view showing light source and sensor components as disposed within a printing apparatus in a preferred embodiment of the present invention.

Unlike the printing apparatus disclosed in the Harshbarger et al. patent, printing apparatus 10 utilizes a tray feed mechanism as its donor supply source in order to supply donor in the form of pre-cut sheets. Donor supply trays 24a and 24b supply donor sheets 52 in interleaved form, with individual sheets 52 successively arranged in C, M, Y, K repetitive order within each tray. (It should be noted that other arrangements are possible, such as providing a separate tray for each C, M, Y, and K process color. Or, donor supply tray 24b could alternately be used to provide an alternate color donor, other than C, M, Y, or K.) A receiver supply tray 26 supplies sheets of receiver for the imaging operation. To write an image, a sheet picker assembly 28 first moves a suction bar 30 into position at receiver supply tray 26. As shown in FIG. 2, suction bar 30 provides vacuum, supplied by vacuum hose 54, to a number of suction cups 74 for lifting sheet donor or receiver from a tray. A picker assembly leadscrew 32 moves sheet picker assembly 28 to receiver supply tray 26. A suction bar lifting leadscrew 34, controlled by a lifting motor 42 and guided by lifting guide rod 56, moves suction bar 30 down to the receiver media in tray 26 until a sheet of receiver media (not shown) is lifted and held by suction bar 30. Sheet picker assembly 28 then moves the receiver sheet onto imaging drum 14, where the receiver sheet is held by vacuum and fitted tightly against drum 14 as drum 14 rotates against a feed roller 76.

Once the receiver sheet is in place on drum 14, sheet picker assembly 28 moves to donor supply tray 24a in order to take the first donor sheet 52. Sheet picker assembly 28 manipulates suction bar 30 into position to lift a single donor sheet 52 and to transfer donor sheet 52 for loading onto imaging drum 14. After the imaging operation using donor sheet 52 is complete, picker assembly 28 cooperates with imaging drum 14 to unload the used donor sheet 52 into a waste donor tray 70. The next donor sheet 52 in succession can then be loaded from tray 24*a* using the sequence described above. When imaging is complete, following ejection of the last donor sheet 52 into waste donor tray 70, picker assembly 28 cooperates with imaging drum 14 in order to eject the completed receiver sheet into a receiver output tray 72.

Referring again to FIG. 2 there is shown the location of light sources 36*a* (red), 36*b* (green), and 36*c* (blue) and their corresponding photosensors 38*a*, 38*b*, and 38*c*. Photosensors 38*a/b/c* are mounted to a printed circuit board 40 that is attached to suction bar 30. Light sources 36*a/b/c* are LEDs, mounted on a bracket 44 connected to a side wall of the printing apparatus 10 chassis. A guide slot 48 in a sheet picker guide plate 46 (a flat metal plate affixed to a side wall of the chassis) cooperates with a tongue member 50 to guide sheet picker assembly 28 along its receiver sheet and donor sheet 52 loading path from trays 24*a*, 24*b,* and 26 to imaging drum 14.

Figure 3:
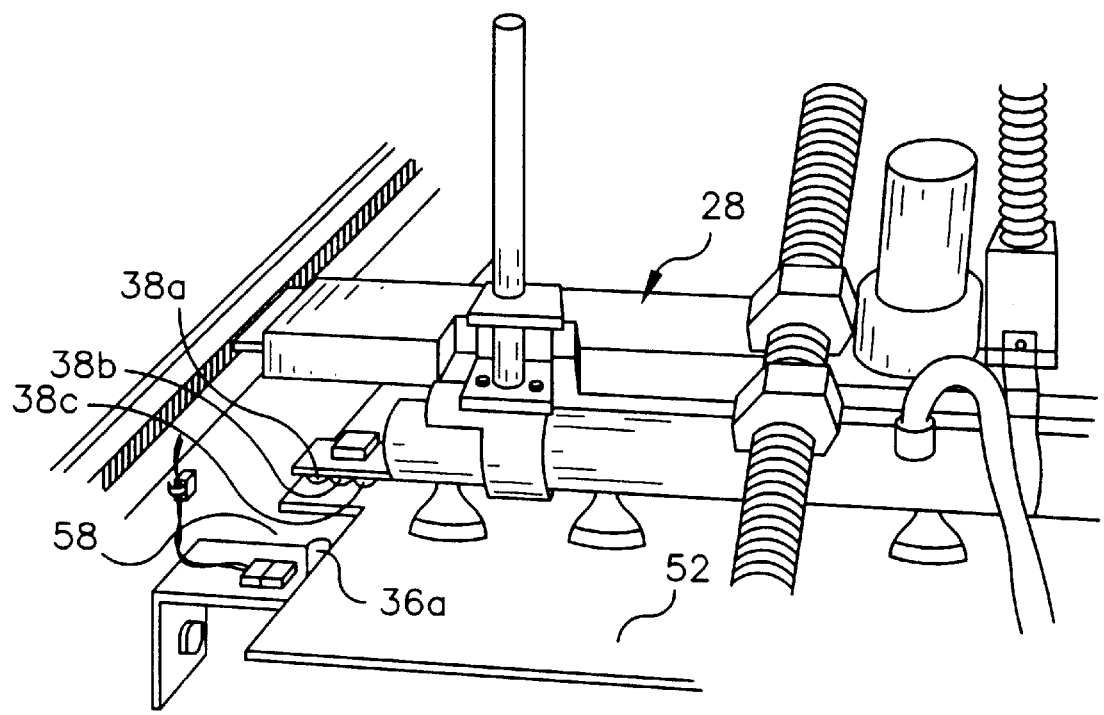
FIG. 3 is a perspective view showing notch sensing provided for determining proper orientation of sheet donor.

Referring to FIG. 3, there is illustrated how photosensors 38*a/b/c* and light sources 36*a/b/c* cooperate to detect a notch 58 that has been cut into each donor sheet 52 (light sources 38*b* and 38*c* are obscured from view by donor sheet 52 in the view of FIG. 3). Notch 58 is used to ascertain whether or not donor sheet 52 is being loaded with the proper side up. (The side of donor sheet 52 that is coated for colorant transfer must be placed facing against the receiver sheet on imaging drum 14.) As shown in FIG. 1, bracket 44 is positioned such that photosensors 38*a/b/c* can detect notch 58 and donor color as donor sheet 52 is pulled forward, by the action of sheet picker assembly 28, from tray 24*a* for loading onto drum 14.

Referring again to FIG. 3, donor sheet 52 is shown with notch 58 indicating incorrect orientation of donor sheet 52. If photosensors 38*a/b/c* detect notch 58, this error condition is sensed by control logic processor 60 and appropriate fault notification is provided to an operator, such as by a message displayed on a control monitor 62. If notch 58 is not sensed and donor sheet 52 has been picked, the measured value of light through an unnotched portion at each photosensor 38*a/b/c* is then taken and processed by control logic processor 60 in order to determine donor sheet 52 color.

Color Sensing Circuitry

Figure 4:
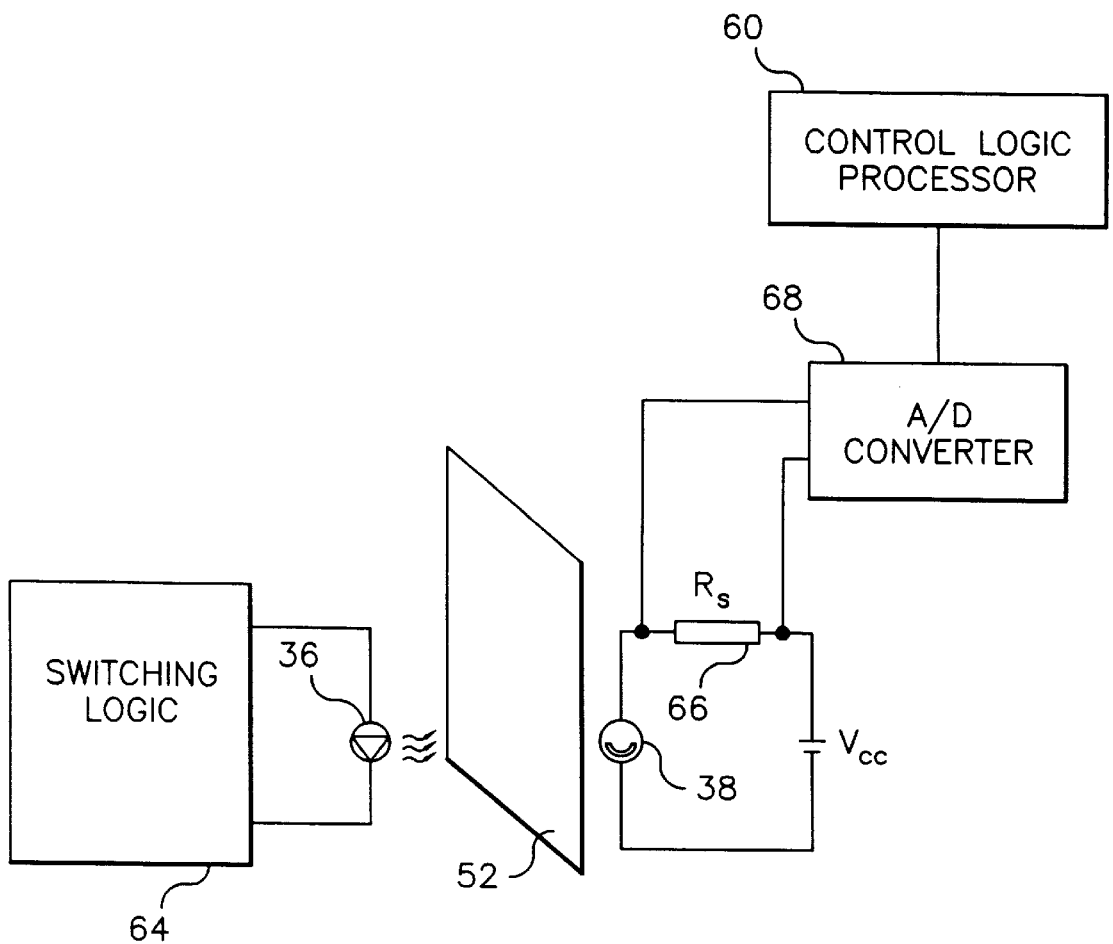
FIG. 4 is a block diagram showing the overall function of light source and sensor components and processing and control logic components for detecting donor color and pick conditions.

Referring to FIG. 4, there is shown a block diagram with a single light source 36/photosensor 38 pair and support components for donor color sensing. A switching logic circuit 64 activates light source 36. The emitted light passes through translucent donor sheet 52 and is detected at photosensor 38. The amount of light energy sensed at photosensor 38 causes a variable voltage reading across a sense resistor $R_S$ 66. The analog voltage read across sense resistor 66 is then input to an A/D converter 68, which provides a digital output value. Control logic processor 60 stores the output values thus provided and processes these values as described hereinbelow.

In a preferred embodiment, A/D converter 68 has 8-bit resolution, providing an output value in the range 0–255. When sensing resistor 66 voltage over a 5 Vdc range, a single increment at this resolution is approximately 20 mV. A suitable A/D converter 68 would be, for example, a TLC 540 from Texas Instruments, Inc., headquartered in Dallas, Tex.

By way of example, and not by way of limitation, the following table lists components used for photosensors 38*a/b/c* and light sources 36*a/b/c* in a preferred embodiment.

| Component | Exemplary device: |
| --- | --- |
| Light source 36a (red) | H-3000L Hi-Super Bright Red LED, from Stanley, located in Tokyo, Japan. |
| Light source 36b (green) | NSPG500s Green LED, from Nichia Corporation, located in Tokushima, Japan. |
| Light source 36c (blue) | NSPB500s Blue LED, from Nichia Corporation, located in Tokushima, Japan. |
| Photosensor 38a/b/c | 21T231 Phototransistor Photosensor from EG&G Vactec, located in St. Louis, MO. |

It should be noted that FIG. 4 shows light source 36 and photosensor 38 detection components for only one color. In the preferred embodiment, three light source 36/photosensor 38 pairs are used. This arrangement provides control logic processor 60 with three digital output values for a single donor sheet 52. It is significant to note that this use of light source 36/photosensor 38 pairs can be generalized, so that four, five, or more light source 36/photosensor 38 pairs could be used to provide digital output data on a single donor sheet 52, using the algorithm described hereinbelow.

Color Detection Algorithm

Control logic processor 60 groups, into one coordinate value, the multiple measured digital output values received from readings taken on a single donor sheet 52. For example, in the preferred embodiment, three readings are measured:

(1) Red, represented as r;

(2) Green, represented as g;

(3) Blue, represented as b.

Figure 5:
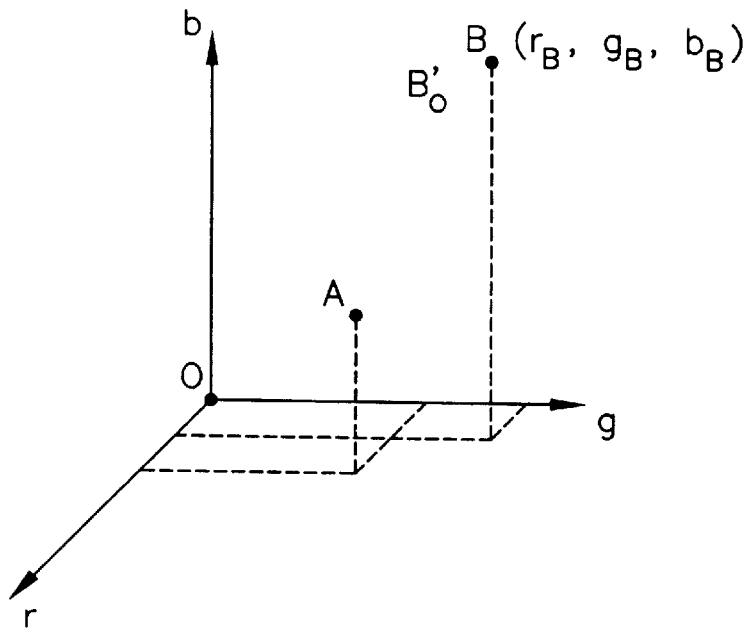
FIG. 5 is a 3-dimensional view of representative reference and measured data points for color and pick conditions.

The coordinate value for a single donor sheet 52 is then in the form (r, g, b). Referring to FIG. 5, this mathematical representation is familiarly represented as a point in a 3-dimensional Cartesian coordinate system.

It is important to note that there are only a discrete number of possible conditions that the donor sensing components represented in FIG. 4 must detect. Briefly, these possible conditions are the following:

(a) A single sheet of donor is picked, typically C, M, Y, K, or known special color (or special-purpose sheet, such as a laminate sheet);

(b) Multiple sheets of donor are picked, in error (this could be two or more sheets of the same color or, if sheet colors were interleaved in a tray, two sheets of different colors); and (c) No donor sheet is picked, in error.

For each of the possible conditions in the above listing, a single reference point in the coordinate system of FIG. 5 can be mapped. Points labeled A and B in FIG. 5 could represent ideal reference coordinates for magenta and cyan donor sheets respectively, for example. These reference coordinates would be determined during a calibration procedure, such as would be executed at initialization of printing apparatus 10. A discrete (that is, finite) number of reference points would be represented with ideal coordinates as obtained during calibration. These reference points, such as A and B in FIG. 5, would identify each possible donor color and picking condition.

With a discrete set of points established at calibration as ideal, or reference points, actual measured readings could then be taken, and actual measured coordinate values obtained, using the components shown in FIG. 4. Referring again to FIG. 5, measured readings would vary somewhat from the reference readings, due to "noise" factors such as component aging, batch variations, dust or dirt, and other causes. For example, point B' in FIG. 5 represents the coordinate value obtained using measured readings for a single sheet of donor. The B' value is pictured in FIG. 5 as being "close" to the calibrated, reference point B (in this example, B being the reference point representative of cyan donor). Referring to the visualization of FIG. 5, the task for the detection algorithm running in control logic processor 60 is to determine whether or not B' is close enough to B to be reliably considered to represent a true cyan donor reading.

Data communications systems encounter a parallel problem to that described above, in which data is transmitted and received over a noisy channel, where the data can have only one of number of possible discrete states. In the data communications art, Maximum Likelihood Detection (MLD) is one statistical method used for decoding data from noise. The present invention adapts the general approach employed by data communication systems using MLD, applying MLD to the color detection problem described herein.

In summary, MLD operates using the model of an observation space, where a possible data state can be represented as a coordinate value having N dimensions, where N represents a number of orthonormal (coarsely "mutually perpendicular" or "mutually independent") basis functions by which the data can be sensed. (FIG. 5 shows, in effect, an observation space employing three orthonormal basis functions, namely, red, green, and blue data readings from stimuli of measured light level. The requirement that basis functions be orthonormal can be interpreted in practical terms, as meaning that the stimuli used for different basis functions do not interfere with one another when measured.) Within this multi-dimensioned representation, a known data value is represented as a reference message point. An actual, measured data value, then, may be "near" a known reference message point data value, but the reception may be affected by noise, which can alter one or more of the N coordinates within the observation space. In order to decode data from noise, MLD partitions the observation space into decision regions (for 3-D observation space, for example, decision regions could be visualized as "decision spheres"). MLD then uses, as its decision rule, the Euclidean distance between measured and known reference values to determine the data state.

Figure 6:
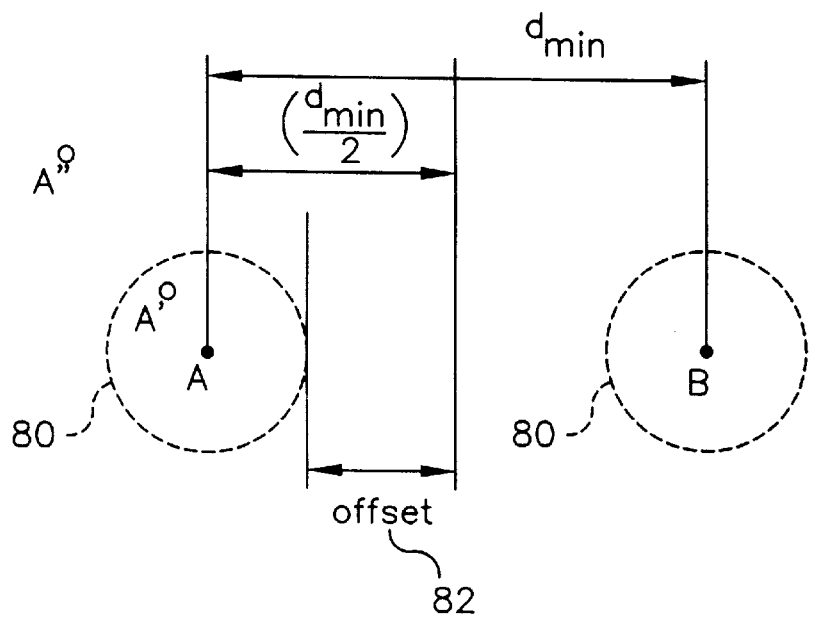
FIG. 6 is a 2-dimensional view showing representative data points for sensing color and pick conditions, illustrating important numerical relationships used.

In a coordinate system, having N dimensions, the Euclidean distance between two points is computed by first summing the squared distances between respective coordinates, and then taking the square root of the total. For example, for a 3-dimensional coordinate system, the Euclidean distance between points P with coordinates (xp, yp, zp) and Q with coordinates $(X_Q, y_Q, z_Q)$ is computed thus:

$$\sqrt{(x_P - x_Q)^2 + (y_P - y_Q)^2 + (z_P - z_Q)^2}$$

Where there are more than two or three dimensions in the observation space (for example, where N equals 4 or 5), the partitioning of an observation space into decision regions can be difficult to visualize. For illustration purposes, FIG. 6 shows the principle of a decision region in a 2-dimensional decision space (where N=2). Here, for a reference point A, the nearest neighboring point (determined using Euclidean distance as is described above) is reference point B. A decision region 80 for each reference point A and B is determined by computing this minimum distance $d_{min}$ to the nearest neighbor, dividing this distance in half ($d_{min}/2$) and subtracting an offset 82 that is empirically determined. An MLD decision region 80 is thereby obtained within the radius computed using the formula:

$$\left\lfloor \frac{d_{min}}{2} \right\rfloor - \text{offset}$$

The "floor function" bracket notation used above simply means that the next integer value equal to or smaller than that obtained by this division by 2 is used; here, this can be interpreted simply as "rounding down".)

Referring again to FIG. 6 there is shown a sample measured point, A'. Because measured point A' falls within decision region 80 obtained for reference point A, control logic employing an MLD algorithm decision rule would determine (from the Euclidean distance from A to A') that the most likely candidate for measured data A' is reference data A. Conversely, measured point A" lies outside decision region 80 and would not be considered as a likely equivalent to reference data A.

In order to apply MLD principles to the problem of donor color and picking detection, the algorithm used in control logic processor 60 requires that a data base of calibration readings be obtained in order to serve as reference data. In a preferred embodiment of the present invention, a table of reference values is completed by sensing each of the donor combinations listed in Table 1. An (r,g,b) coordinate (analogous to the 3-dimensional model represented in FIG. 5) is computed and stored for each possible donor condition.

TABLE 1

| Possible donor condition | Description |
| --- | --- |
| O | NO DONOR PICKED. Provides an origin value (0,0,0) for all other readings. (Error if sensed during actual operation.) |
| C | CYAN (single sheet) |
| M | MAGENTA (single sheet) |
| Y | YELLOW (single sheet) |
| K | BLACK (single sheet) |
| CC | CYAN-CYAN (multiple sheets). Error |
| MM | MAGENTA-MAGENTA (multiple sheets). Error |
| YY | YELLOW-YELLOW (multiple sheets). Error |
| KK | BLACK-BLACK (multiple sheets). Error |
| CM | CYAN-MAGENTA (multiple sheets). Error |
| MY | MAGENTA-YELLOW (multiple sheets). Error |
| YK | YELLOW-BLACK (multiple sheets). Error |
| KC | BLACK-CYAN (multiple sheets). Error |

For a preferred embodiment, Table 2 shows sample readings for a subset of typical reference points obtained in the printing apparatus 10 of the present invention, using the A/D converter and sensing components noted hereinabove. Table 2 values are expressed as Euclidean distances. For example, the Euclidean distance between a single cyan sheet (C) and the origin (O, for no sheet picked) is 164.

TABLE 2

| CYAN | | MAGENTA | | YELLOW | | BLACK | |
| --- | --- | --- | --- | --- | --- | --- | --- |
| C to O: | 164 | M to O: | 67 | Y to O: | 86 | B to O: | 298 |
| CC to O: | 213 | MM to O: | 218 | YY to O: | 163 | BB to O: | 367 |
| C to CC: | 58 | M to MM: | 153 | Y to YY: | 82 | K to KK: | 72 |

In the present invention, decision region 80 is a 3-dimensional region, which can be visualized as a sphere. Typical maximum likelihood detection spheres r are, for example: $r_{CYAN}=28$, $r_{magenta}=75$, $r_{yellow}=40$ and $r_{BLACK}=35$.

(For these typical MLD spheres in a preferred embodiment, the value of offset 82 equals 1.)

It is significant to note that, while a preferred embodiment of the present invention uses a 3-dimensioned observation space, with data from red, green, and blue light source 36/photosensor 38 pairs, the method described herein can be used with any N-dimensioned observation space, where integer N is 2 or greater. Thus, for example, a fourth light source 36/photosensor 38 pair could be added in order to provide a 4-dimensioned observation space. The same method described above would then apply, with 4-dimensioned coordinates assigned to each measured and reference data point. An Euclidean distance between points would be computed by summing, for each of the 4 coordinates, the square of the difference, and then by taking the square root of that sum. A 4-dimensioned observation space could thereby provide additional resolution for more accurate color detection than would be available using only 2 or 3 light source 36/photosensor 38 pairs.

Figure 7:
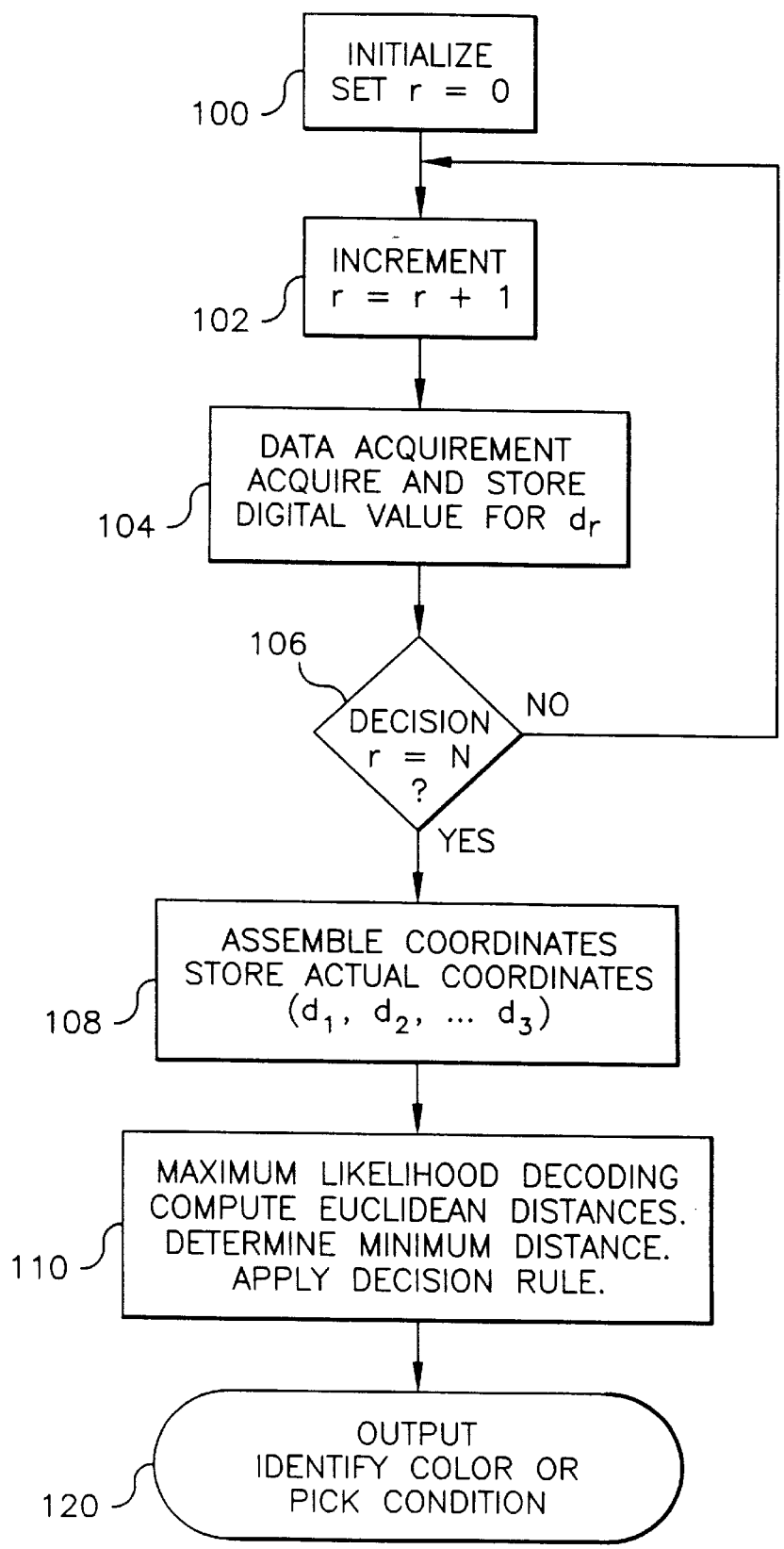
FIG. 7 is a flow chart showing the key processes in a color determination algorithm using the method of the present invention.

Referring to FIG. 7, there is shown a flowchart showing a generalized algorithm for employing Maximum Likelihood Decoding in donor detection. For the preferred embodiment, N=3 in FIG. 7. However, as just described, N could be some higher integer value for increased accuracy. At an initialization step 100, index counter value r is reset to zero. An increment step 102 increments index r for each light source 36/photosensor 38 pair from which data is to be gathered. A data acquirement step 104 acquires and stores the measured digital value, d, obtained for one light source 36/photosensor 38 pair using the circuitry shown in FIG. 4. A decision step 106 determines whether or not data $d_N$ from each light source 36/photosensor 38 pair has been acquired. If not, the algorithm loops back to increment step 102 and repeats steps 102 and 104. If all data has been acquired from light source 36/photosensor 38 pairs, the algorithm proceeds to an assemble coordinates step 108 in which the readings taken successively in the sequence of steps 102, 104, and 106 are assembled to provide a single N-dimensioned coordinate $(d_1, d_2, \ldots d_N)$. A Maximum Likelihood Decoding step 110 then computes Euclidean distances between the measured N-dimensioned coordinate data and other known, predefined reference data points. Step 110 follows a decision rule that determines the most likely color of donor (or mispick condition), based on the coordinate data. An output step 120 identifies the donor color or pick condition to control logic processor 60, for executing printing or fault handling operations that follow.

Alternate Embodiments

While the invention has been described with particular reference to its preferred embodiments, it will be understood by those skilled in the art that various changes may be made and equivalents may be substituted for elements in the preferred embodiments without departing from the scope of the invention. For example, not only could the number of light source 36/photosensor 38 pairs be set to any integer 2 or greater, but the specific colors chosen for any light source 36/photosensor 38 pair could be selected for suitability to a specified donor. The specific emitters described herein emit radiation over a relatively narrow spectrum. For example a preferred red emitter emits light at 660 nm+/−25 nm and may be considered as being an emitter or light source capable of emitting light at a predefined optical wave length. Selection of specific light source 36 colors could, for example, help to identify donor colors that are similar and might be otherwise difficult to differentiate using standard red, green, and blue sensitivity. (This could be used, for example, to differentiate a donor colorant for European yellow from a donor colorant for a U.S. yellow.) Light sources 36 could alternately emit radiation outside the visible spectrum (such as infrared light) for detection. A single broadband light source 36 that emits a range of wavelengths could be employed. While paired light source 36/photosensors 38 are used in the preferred embodiment, it could be possible to use multiple light sources 36 with a single photosensor 38, where the signal level from each light source 36 can be discriminated from the other light sources using timing or other mechanism. Or, filters could be employed to allow a single wide-band light source 36 to provide multiple wavelengths for detection. Still further, it is known to provide a single light source that can be pulsed to emit different colors in accordance with different currents supplied thereto, in essence such an emitter is the equivalent of two emitters. While a preferred embodiment employs light transmitted through a donor colorant, the present invention could utilize N-dimensioned measurements of reflected light. Whether it be through detection of transmitted or reflected light, such detection results from light impingement upon an article having a colorant in or on the article.

In its broadest application, the apparatus of the present invention could be used in any device that senses a colorant. The present invention could be employed in any of a number of types of printing apparatus, such as a color printer, platemaker, or other device that uses a donor material provided in sheet form. The present invention can be used for sensing color donor, such as the conventional C, M, Y, K process colors, or special colors other than C, M, Y, and K. This invention could also be used to detect sheet materials having some other function, such as laminate sheets, for example.

While the preferred embodiment of the present invention uses notch detection to sense proper orientation of a donor sheet, it may be feasible to use the MLD algorithm techniques described herein to detect whether or not the donor sheet has the proper surface orientation by distinguishing between differences in transmission depending upon orientation of the donor sheet. For example, one surface of a donor sheet may be more reflective than the other and the emitter could be placed at an angle other than 90° to the surface to capitalize upon the differences in reflectivity of the surfaces. The donor sheets of different colors may be provided in collated ordered form in a single tray or separate donor color trays.

While the preferred embodiment differentiates color for donor material provided as separate sheets, the same method could be employed for detection of color when the donor material is provided in roll form. The light emitters and sensors may also determine whether or not a receiver sheet has been picked in view of the fact that the receiver sheets are substantially opaque to the light from the light emitters.

Faster calculation of colorant may be made by the control logic keeping track of previous picked donor sheets and their order and thus anticipating the expected colorant and first making a calculation of distance from the expected colorant reference value to determine if the distance between the coordinate value of the measured colorant and the expected reference coordinate value falls within the maximum likelihood detection sphere. If it does, calculation relative to other reference values in step 110 need not be made. Colorant may be anticipated by the expected order of a series of colored donor sheets.

Therefore, what is provided is a color sensing apparatus adapted to sense donor color and mispick conditions and a method for sensing color and donor sheet mispick conditions.

While the present invention has been illustrated by the description of embodiments thereof, and while the embodiments have been described in some detail, it is not the intention of the applicants to restrict or in any way limit the scope of the appended claims to such detail. Additional advantages and modifications will readily be apparent to those skilled in the art. Therefore, the invention in its broader aspects is not limited to the specific details, representative apparatus and method, and illustrative examples shown and described. Accordingly, departures may be made from such details without departing from the spirit or scope of the applicants' general inventive concept.

PARTS LIST

10. Printing apparatus
12. Printhead
14. Imaging drum
16. Printhead translation apparatus
18. Leadscrew, printhead
20. Front guide rod
22. Rear guide rod
24a,b. Donor supply tray
26. Receiver supply tray
28. Sheet picker assembly
30. Suction bar
32. Picker assembly leadscrew
34. Suction bar lifting leadscrew
36a. Light source, red
36b. Light source, green
36c. Light source, blue
38a/b/c. Photosensor
40. Printed circuit board
42. Lifting motor
44. Bracket
46. Sheet picker guide plate
48. Guide slot
50. Tongue member
52. Donor sheet
54. Vacuum hose
56. Lifting guide rod
58. Notch
60. Control logic processor
62. Control monitor
64. Switching logic circuit
66. Sense resistor
68. A/D converter
70. Waste donor tray
72. Receiver output tray
74. Suction cups
76. Feed roller
80. Decision region
82. Offset
100. Initialization step
102. Increment step
104. Data acquirement step
106. Decision step
108. Assemble coordinates step
110. Maximum Likelihood Decoding step
120. Output step

What is claimed is:

1. A color sensing apparatus for distinguishing a colorant in or on an article from a set of predefined colorants, the apparatus comprising:
   (a) N light sources, wherein N is a plural number, each of said N light sources capable of emitting light having a predefined optical wavelength for impingement on said article;
   (b) for each one of said N light sources, a corresponding optical sensor, each said optical sensor responsive to said predefined optical wavelength and providing a variable output signal that is indicative of the sensed level of light energy at said predefined optical wavelength;
   (c) a control logic processor adapted to accept each said variable output signal from each said corresponding optical sensor, said control logic processor further adapted to convert each said variable output signal to a numerical value, to assign a measured N-dimensional coordinate value comprising each of said numerical values, to compare said measured N-dimensional coordinate value to stored reference N-dimensional coordinate values, and using a Maximum Likelihood Detection algorithm to identify said colorant thereby.

2. The color sensing apparatus of claim 1 wherein N equals three.

3. The color sensing apparatus of claim 1 wherein N equals four.

4. The color sensing apparatus of claim 1 wherein said N light sources emit visible light.

5. The color sensing apparatus of claim 1 wherein said N light sources emit red, blue, and green light respectively.

6. The color sensing apparatus of claim 1 wherein at least one of said N light sources comprises an optical filter.

7. The color sensing apparatus of claim 1 wherein said colorant is a dye, ink or pigment.

8. The color sensing apparatus of claim 1 wherein said control logic processor is programmed to compare said measured N-dimensional coordinate value with the reference values by computing distances between the reference values and the measured coordinate value.

9. The color sensing apparatus of claim 1 wherein said colorant is provided on a donor sheet.

10. The color sensing apparatus of claim 9 wherein said donor sheet is provided from a tray.

11. The color sensing apparatus of claim 10 wherein said tray is a manual feed tray.

12. The color sensing apparatus of claim 9 wherein said donor sheet is provided from a roll.

13. The color sensing apparatus of claim 1 and wherein the control logic processor uses the Maximum Likelihood Detection algorithm to determine the coordinate value that is closest to one of the plural reference values.

14. The color sensing apparatus of claim 13 and wherein the control logic processor anticipates color of or colorants associated with the article and uses the Maximum Likelihood Detection algorithm to confirm that the coordinate value is within that expected for the color of or colorant associated with that article.

15. A printing apparatus for printing an image by transferring a colorant from a donor sheet onto a receiver substrate, in which apparatus a donor delivery mechanism guides the donor sheet from a donor supply source, along a donor travel path, to a colorant transfer apparatus, the printing apparatus comprising:
   (a) N light sources disposed along said donor travel path, each of said N light sources capable of emitting light having a predefined optical wavelength, N being a plural number;

(b) for each one of said N light sources, a corresponding optical sensor disposed along said donor travel path, each said optical sensor responsive to said predefined optical wavelength and providing a variable output signal that is indicative of the sensed level of light energy at said predefined optical wavelength;

(c) a control logic processor for controlling said donor delivery mechanism, said control logic processor adapted to accept each said variable output signal from each said corresponding optical sensor, said control logic processor further adapted to convert each said variable output signal to a numerical value, to assign an N-dimensional coordinate value comprising each of said numerical values, to compare said N-dimensional coordinate value to stored reference values, and using a Maximum Likelihood Detection algorithm to determine thereby the color of the donor sheet; and (d) a printhead forming part of the colorant transfer apparatus and operable to transfer colorant from the donor sheet to the receiver sheet.

16. The printing apparatus of claim 15 wherein N equals three.

17. The printing apparatus of claim 15 wherein N equals four.

18. The printing apparatus of claim 15 wherein said N light sources emit visible light.

19. The printing apparatus of claim 15 wherein said N light sources emit red, blue, and green light.

20. The printing apparatus of claim 15 wherein at least one of said N light sources comprises an optical filter.

21. The printing apparatus of claim 15 wherein said donor supply source comprises a tray.

22. The printing apparatus of claim 15 wherein said donor supply source comprises a roll.

23. The printing apparatus of claim 15 wherein said donor supply source comprises a slot for manual feeding of donor to the apparatus.

24. The printing apparatus of claim 15 wherein said colorant is a dye, ink or pigment.

25. The printing apparatus of claim 15 wherein said control logic processor is programmed to compare said N-dimensional coordinate value with the reference values by computing distance between the reference values and the coordinate value.

26. The printing apparatus of claim 25 wherein said control logic processor compares distances between plural reference values to said N-dimensional coordinate value to determine a shortest distance between the N-dimensional value and a reference value.

27. The printing apparatus of claim 15 wherein said receiver substrate is paper.

28. The printing apparatus of claim 15 wherein said receiver substrate is film.

29. A method for distinguishing a colorant in or on an article from a finite set of predefined colorants, comprising:

(a) emitting, from each one of N light sources, light at a predefined optical wavelength to impinge upon the article, N being a plural number;

(b) sensing for each one of said N light sources, a measured signal value that is indicative of the sensed level of light at said predefined optical wavelength and resulting from impingement with the article;

(c) converting said measured signal value for each one of said N light sources to a numerical value, to obtain N numerical values;

(d) obtaining an N-dimensional coordinate measured value comprising each said numerical value;

(e) comparing said N-dimensioned coordinate measured value with predetermined N-dimensional coordinate reference values; and (f) using a Maximum Likelihood Detection algorithm to identify said colorant.

30. The method of claim 29 wherein the step of comparing said N-dimensional coordinate measured value with said predetermined N-dimensional coordinate reference values comprises the step of computing a Euclidean distance between said N-dimensional coordinate measured value and said predetermined N-dimensional coordinate reference values.

31. The method of claim 28 further comprising the step of determining, for a first reference colorant, a first predetermined N-dimensioned coordinate reference value, said step comprising:

(a) emitting, from each of said N light sources, light at said predefined optical wavelength to impinge upon an article having the first reference colorant;

(b) obtaining, for each one of said N light sources, a first reference colorant signal value that is indicative of a respective sensed level of light at said predefined optical wavelength and resulting from impingement with the article having the first reference colorant;

(c) converting said first reference colorant signal value for each one of said N light source to a first reference colorant numerical value;

(d) obtaining the first predetermined N-dimensioned coordinate reference value for said first reference colorant comprising each said first reference colorant numerical value.

32. The method of claim 30 further comprising the step of determining, for a second reference colorant, a predetermined second N-dimensioned coordinate reference value, said step comprising:

(a) emitting, from each of said N light sources, light at said predefined optical wavelength to impinge upon an article having the second reference colorant;

(b) obtaining, for each on of said N light sources, a second reference colorant signal value that is indicative of a respective sensed level of light at said predefined optical wavelength and resulting from impingement with the article having the second reference colorant;

(c) converting said second reference colorant signal value for each one of said N light sources to a second reference colorant numerical value;

(d) obtaining said predetermined second N-dimensioned coordinate reference value for said second reference colorant comprising each said second reference colorant numerical value.

33. The method of claim 32 further comprising the step of determining a final decision radius for said first N-dimensioned coordinate reference value, comprising:

(a) computing a Euclidean distance between said first N-dimensional coordinate reference value and said second N-dimensional coordinate reference value;

(b) calculating a proportion of said Euclidean distance to obtain an approximate decision radius;

(c) subtracting a predetermined offset from said approximate decision radius to obtain a final decision radius.

34. The method of claim 29 wherein in step (e) said N-dimensioned coordinate measured value is first compared with an expected predetermined N-dimensional coordinate reference value in accordance with an expected order in the finite set of predefined colorants before being compared with a reference value that is unexpected.

35. A color sensing apparatus for distinguishing a colorant on or in an article from a set of predefined colorants, the apparatus comprising:

(a) a broadband light source capable of emitting light at each of N predefined optical wavelengths to impinge upon the article;

(b) for each one of said plurality of N predefined optical wavelengths, a corresponding optical sensor, each said optical sensor responsive to a respective one of the N predefined optical wavelengths and providing a variable output signal that is indicative of the sensed level of light energy at the predefined optical wavelength resulting from impingement with the article;

(c) a control logic processor adapted to accept each said variable output signal from each said corresponding optical sensor, said control logic processor further adapted to convert each said variable output signal to a numerical value, to assign a measured N-dimensional coordinate value comprising each of said numerical values, to compare said measured N-dimensional coordinate value to stored reference N-dimensional coordinate values, and using a Maximum Likelihood Detection algorithm to identify said colorant thereby.

36. The color sensing apparatus of claim 35 and wherein the color sensing apparatus forms part of a printing apparatus for printing an image by transferring plural colorants from one or more donor sheets onto a receiver sheet, in which printing apparatus a donor delivery mechanism is provided for moving one or more donor sheets at a time from a donor supply source along a donor travel path to a colorant transfer printing section and the color sensing apparatus is adapted to sense colorant of the donor sheets.

37. The color sensing apparatus of claim 36 and wherein the control logic processor uses the Maximum Likelihood Detection algorithm to determine the coordinate value that is closest to one of the plural reference values.

38. The color sensing apparatus of claim 37 and wherein the control logic processor anticipates color of or colorants associated with the article and uses the Maximum Likelihood Detection algorithm to confirm that the coordinate value is within that expected for the color of or colorant associated with that article.

39. A color sensing apparatus for distinguishing color of or colorants in or on an article from a set of predefined colors or colorants, the apparatus comprising:

(a) one or more light sources providing light having N plural predefined relatively narrow ranges of wavelengths of light that are transmitted through or reflected from the article;

(b) optical sensor means responsive to said N predefined ranges of wavelengths of light transmitted through or reflected from the article and providing respective output signals indicative of the respective sensed levels of light energy at said predefined ranges of wavelengths;

(c) a control logic processor adapted to accept each of said output signals and further adapted to convert each said output signal to a numerical value and to assign an N-dimensional coordinate value comprising each of said numerical values, and using said N-dimensional coordinate value in conjunction with stored reference values in a Maximum Likelihood Detection algorithm to determine thereby the color of or a colorant associated with the article.

40. The color sensing apparatus of claim 39 and wherein at least one of said plurality of N light sources comprises a relatively broad spectrum light emitter and an optical filter that substantially narrows the spectrum of light emitted by the optical filter to a relatively narrower spectrum or range of wavelengths including one of the predefined ranges of wavelengths.

41. The color sensing apparatus of claim 39 and wherein an optical sensor senses light from at least two of said N light sources at different times.

42. The color sensing apparatus of claim 39 and wherein the color sensing apparatus forms part of a printing apparatus for printing an image by transferring plural colorants from one or more donor sheets onto a receiver sheet, in which apparatus a donor delivery mechanism is provided for moving one or more donor sheets at a time from a donor supply source along a donor travel path to a colorant transfer printing section and the color sensing apparatus is adapted to sense colorant of the donor sheets.

43. The color sensing apparatus of claim 42 and wherein the control logic processor uses the Maximum Likelihood Detection algorithm to determine the coordinate value that is closest to one of plural reference values.

44. The color sensing apparatus of claim 43 and wherein the control logic processor anticipates color of or colorants associated with the article and uses the Maximum Likelihood Detection algorithm to confirm that the coordinate value is within that expected for the color of or colorant associated with that article.

45. The color sensing apparatus of claim 39 and wherein the control logic processor uses the Maximum Likelihood Detection algorithm to determine the coordinate value that is closest to one of plural reference values.

46. The color sensing apparatus of claim 39 and wherein the control logic processor anticipates color of or colorants associated with the article and uses the Maximum Likelihood Detection algorithm to confirm that the coordinate value is within that expected for the color of or colorant associated with that article.

47. A color sensing method for distinguishing color of or colorants in or an article from a set of predefined colors or colorants, the method comprising:

(a) providing light having N plural predefined relatively narrow wavelengths that are transmitted through or reflected from the article;

(b) sensing the N predefined ranges of wavelengths of light transmitted through or reflected from the article and providing respective output signals indicative of the respective sensed levels of light energy at said predefined ranges of wavelengths; and (c) converting each said output signal to a numerical value, assigning an N-dimensional coordinate value comprising each of said numerical values and using said N-dimensional coordinate value in conjunction with stored reference values in a Maximum Likelihood Detection algorithm to determine thereby the color of or the colorants associated with the article.

48. The method of claim 47 and wherein the article is a donor sheet and including the step of transferring plural colorants from one or more donor sheets onto a receiver sheet in a printing operation.

49. The method of claim 48 and wherein two donor sheets are inadvertently fed simultaneously in superposed relationship and the coordinate value is determined through transmission of light through both of the donor sheets to detect an inadvertent double feed of the donor sheets.

50. The method of claim 49 and wherein in using the N-dimensional coordinate value Euclidean distances between the coordinate value and the stored reference values are determined and a decision rule is applied and a determination of a double feed is made.

51. The method of claim 48 and wherein determination of the color of or colorants associated with the article is made based on anticipation of the color of or colorants associated with the article and confirmation thereof using the Maximum Likelihood Detection algorithm.

52. The method of claim 47 and wherein in using the N-dimensional coordinate value Euclidean distances between the coordinate value and the stored values are determined.

53. The method of claim 47 and wherein determination of the color or colorants associated with the article is made based on anticipation of the color of or colorants associated with the article and confirmation thereof using the Maximum Likelihood Detection algorithm to confirm that the coordinate value is within that expected for the color of or colorants associated with the article.

* * * * *